United States Patent [19]

Stimple et al.

[11] Patent Number: 5,177,560
[45] Date of Patent: Jan. 5, 1993

[54] OPTICAL SPECTRUM ANALYZER HAVING ADJUSTABLE SENSITIVITY

[75] Inventors: James R. Stimple, Santa Rosa; Zoltana D. Azary, Sebastopol; Kenneth R. Wildnauer; Steven D. Warwick, both of Santa Rosa, all of Calif.

[73] Assignee: Hewlett-Packard Company, Palo Alto, Calif.

[21] Appl. No.: 788,571

[22] Filed: Nov. 6, 1991

[51] Int. Cl.$^5$ ............................. G01J 3/02; G01J 3/18
[52] U.S. Cl. ..................................... 356/308; 356/328
[58] Field of Search ............... 356/308, 309, 319, 323, 356/325, 326, 328, 332, 333, 334

[56] References Cited

U.S. PATENT DOCUMENTS

| | | | |
|---|---|---|---|
| 4,169,678 | 10/1979 | Inoue et al. | 356/321 |
| 4,180,327 | 12/1979 | Maeda et al. | 356/320 |
| 4,330,207 | 5/1982 | Nogami et al. | 356/318 |

Primary Examiner—F. L. Evans
Attorney, Agent, or Firm—William C. Milks, III

[57] ABSTRACT

An optical spectrum analyzer is provided with a user selectable sensitivity. Required operating parameters are set in response to user selection of sensitivity to permit measurement of an input light beam at the selected sensitivity. Setting the required parameters includes setting a required gain of a video channel to permit measurement of a specified maximum light signal and to provide the selected sensitivity, setting a required video bandwidth of the video channel to provide the selected sensitivity at the required gain of the video channel and setting a sweep rate to provide the selected sensitivity at the required video bandwidth. When the normal bandwidth of the video channel is not adequate to provide the selected sensitivity, the electrical signal is passed through a digital filter having a filter coefficient set to provide the required video bandwidth. A peak detector is incorporated in the video channel to accurately measure signal amplitudes in a fast scanning condition.

17 Claims, 13 Drawing Sheets

OPTICAL SPECTRUM ANALYZER HAVING ADJUSTABLE SENSITIVITY

FIELD OF THE INVENTION

This invention relates to instruments for analyzing the spectrum of a light beam and, more particularly, to optical spectrum analyzers wherein the sensitivity is adjustable by the user so as to provide optimized sweep time and dynamic range.

BACKGROUND OF THE INVENTION

Optical spectrum analyzers are used for analyzing the output light beams from lasers, light-emitting diodes and other light sources. Optical spectrum analyzers are particularly useful for analyzing light sources for optical telecommunication, where it is preferable to ensure that the optical carrier includes only a single, spectrally pure wavelength. In optical spectrum analyzers, the light intensity of a light beam is displayed as a function of wavelength over a predetermined wavelength range. Parameters of importance in optical spectrum analyzers include wavelength range, wavelength and amplitude accuracy, sensitivity, resolution, measurement speed, polarization insensitivity and dynamic range.

Optical spectrum analyzers frequently use a diffraction grating for separating the light beam to be analyzed into its component wavelengths. The input light beam to be analyzed is collimated and is directed at the diffraction grating. The light beam is spatially dispersed by the grating, since different wavelengths are diffracted at different angles. The grating is rotated so that the dispersed light beam is scanned over a slit. The light that passes through the slit is detected to provide an output signal that represents amplitude as a function of wavelength. The width of the slit establishes the resolution of the monochromator. Prior art optical spectrum analyzers have used single stage monochromators as described above and two stage monochromators, wherein two monochromators operating in series provide improved performance. The output electrical signal is displayed as a function of diffraction grating position to provide an optical spectrum of the input light beam.

Optical spectrum analyzers should operate over a wide range of parameter values for maximum versatility. For example, the selected wavelength span may range from a few nanometers to a few hundred nanometers. In some cases, the user may wish to accurately measure low amplitude signals, thereby requiring long sweep times. In other cases, accurate measurement of small amplitude signals may not be important to the user, and the sweep rate can be increased. Prior art optical spectrum analyzers have not adequately addressed the wide variety of user requirements.

Optical spectrum analyzers with optical fiber inputs sometimes receive low power signal levels, which require long sweep times. Long sweep times are required because of the need for averaging to increase the signal-to-noise ratio. Frequently, the user selects a reference level to capture a peak of a signal and specifies a vertical amplitude scale on the optical spectrum analyzer display. However, without any other information, the instrument may be required to sweep very slowly in order to accurately display signals of the power level represented by the bottom of the display screen. The long sweep times are not acceptable to the user when the signal level represented by the bottom of the display is not of interest.

Prior art optical spectrum analyzers usually require the user to select a detection or averaging method, or a mode where the instrument is either highly sensitive or less sensitive. Prior art systems have had several disadvantages. The user is not provided with information as to the minimum signal that is accurately displayed by the instrument. Furthermore, by providing only two or three instrument modes, the instrument is in most cases sweeping more slowly than necessary for the minimum detectable signal that is to be displayed. In addition, prior art systems have typically not provided information as to how the measurement is being taken. Without such information, erroneous measurements can occur.

It is a general object of the present invention to provide improved methods and apparatus for optical spectrum analysis.

It is another object of the present invention to provide methods and apparatus for optical spectrum analysis wherein the sensitivity is adjustable by the user.

It is another object of the present invention to provide methods and apparatus for optical spectrum analysis wherein peak detectors are incorporated in the video channel to accurately measure signal amplitudes in a fast scanning condition.

It is a further object of the present invention to provide methods and apparatus for optical spectrum analysis wherein the sweep time is optimized for a given set of measurement parameters.

It is yet another object of the present invention to provide methods and apparatus for optical spectrum analysis wherein the sweep time and video bandwidth are automatically adjusted in response to user selection of sensitivity.

It is still another object of the invention to provide methods and apparatus for optical spectrum analysis wherein the sensitivity is displayed to the user.

SUMMARY OF THE INVENTION

According to the present invention, these and other objects and advantages are achieved in methods and apparatus for spectrum analysis of an input light beam using an optical spectrum analyzer. The method of the invention comprises the steps of providing the optical spectrum analyzer with a user selectable sensitivity, setting required operating parameters in response to user selection of sensitivity to permit measurement of the input light beam at the selected sensitivity, and providing an optical spectrum of the input light beam at the selected sensitivity. By permitting user selection of sensitivity, the sweep rate is optimized for the selected measurement parameters, and the user is aware of the minimum input signal that can be measured accurately.

The optical spectrum analyzer includes a video channel that processes an electrical signal representative of the intensity of the input light beam as a function of wavelength. The step of setting required operating parameters typically includes setting a required gain of the video channel to permit measurement of the maximum input signal and to provide the selected sensitivity. The step of setting required operating parameters typically further includes setting a required video bandwidth of the video channel to provide the selected sensitivity at the required gain of the video channel and setting a sweep rate at which the optical spectrum analyzer performs a wavelength scan of the input light beam, to provide the selected sensitivity at the required video bandwidth.

When the selected sensitivity is less than the sensitivity that is normally available in the video channel, the electrical signal is passed through a digital filter, and the filter coefficient of the digital filter is set to provide the required video bandwidth. When the analog bandwidth of the video channel is adequate to provide the required sensitivity, the digital filter is not used.

The step of setting the required gain of the video channel can be performed by selecting a single gain value that permits measurement of the maximum input signal without substantial compression and provides the selected sensitivity. When measurement of the maximum input signal and the selected sensitivity cannot be obtained with a single gain setting, a low gain value is set to permit measurement of the maximum input signal without compression, and a high gain value is set to provide the selected sensitivity. In this case, the step of performing a wavelength scan of the input light beam includes autoranging between the high and low gain values during the wavelength scan, depending on the level of the input light beam.

According to another aspect of the invention, there is provided a method for spectrum analysis of an input light beam using an optical spectrum analyzer. The method comprises the steps of providing the optical spectrum analyzer with a user specified maximum input signal, setting required operating parameters to permit measurement of the user specified maximum input signal, displaying a sensitivity that corresponds to the required operating parameters, and providing an optical spectrum of the input light beam. When a sensitivity is not selected by the user, the optical spectrum analyzer automatically determines the sensitivity corresponding to the required parameters and displays the sensitivity to the user.

According to a further aspect of the invention, there is provided a method and apparatus for optical spectrum analysis using a peak detector to acccurately measure signal amplitudes during fast scanning. An optical spectrum analyzer for spectrum analysis of an input light beam comprises means for performing a wavelength scan of the input light beam to provide an electrical signal that represents the intensity of the input light beam as a function of wavelength, means for detecting a peak value of the electrical signal during each of a plurality of predetermined intervals, means for measuring the peak values during each of the predetermined intervals, and means for displaying the peak values as a function of wavelength to provide an optical spectrum of the input light beam.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

Figure 1A:
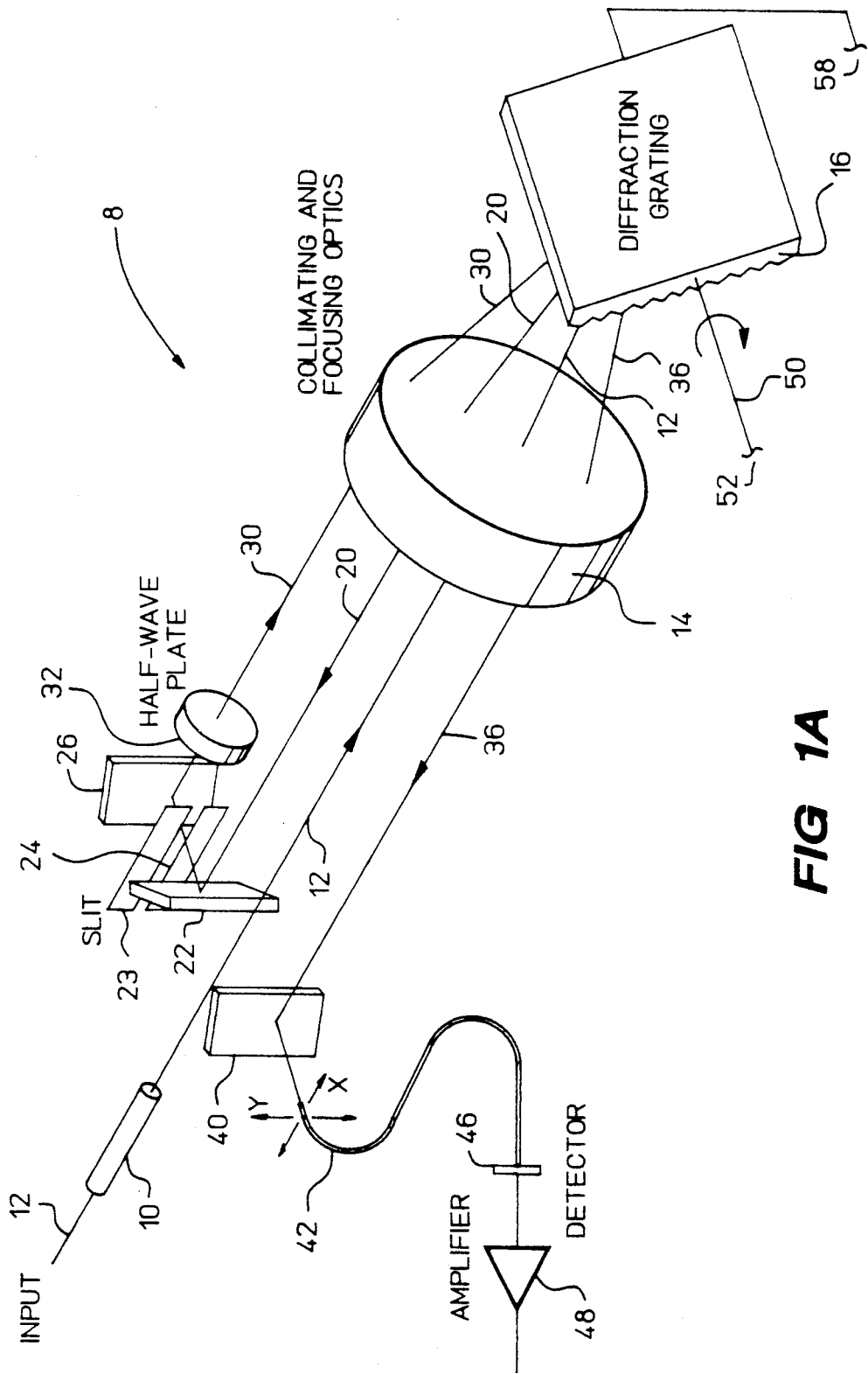
FIGS. 1A and 1B constitute a pictorial block diagram of a double-pass scanning monochromator for use in an optical spectrum analyzer.
Figure 1B:
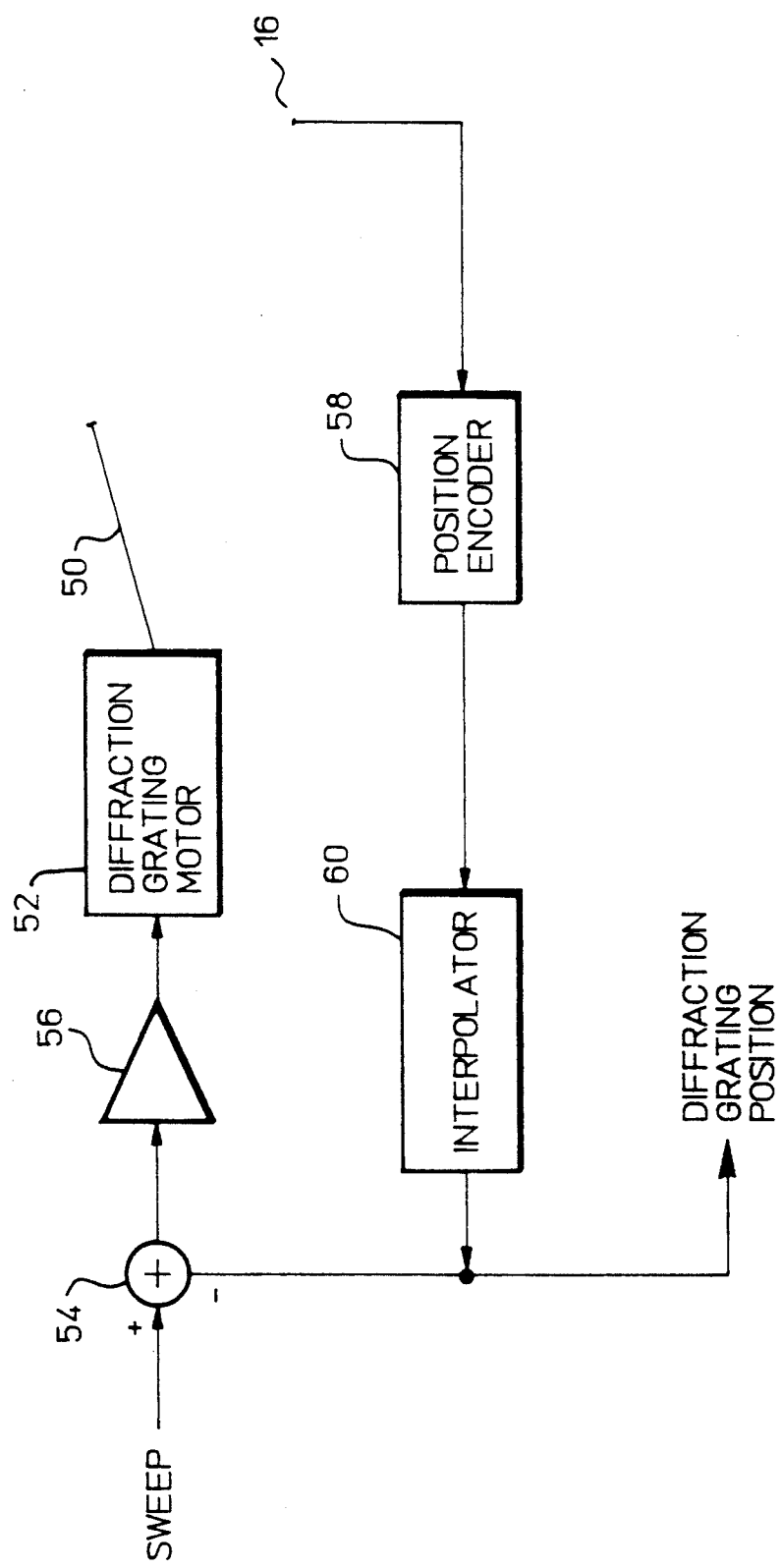

An important component of an optical spectrum analyzer is a monochromator for separating an input light beam to be analyzed into its wavelength components. A double-pass scanning monochromator 8 is shown pictorially in FIGS. 1A and 1B. An input optical fiber 10 directs an input light beam 12 through a lens 14 to a diffraction grating 16. The input optical fiber 10 acts an input slit or aperture of the system. The input light beam 12 is collimated by the lens 14 prior to incidence on diffraction grating 16. The diffraction grating 16 diffracts the input light beam 12 to produce a spatially dispersed light beam 20. Since the diffraction grating 16 diffracts different wavelengths at different angles, as is well known, the input light beam 12 is spatially separated into its component wavelengths.

The spatially dispersed light beam 20 passes through lens 14 and is reflected by a mirror 22 to an aperture plate 23 having a slit 24 that determines the resolution of the monochromator. The dispersed light beam 20 is focused by lens 14 at the plane of slit 24. The slit 24 passes a selected portion of the dispersed light beam 20. Slits 24 with different widths are used to provide different resolutions. The slit 24 acts as a spatial filter of the dispersed light beam 20 to produce a filtered light beam 30.

The filtered light beam 30 is reflected by a mirror 26 through a half-wave plate 32 and lens 14 to the diffraction grating 16. The filtered light beam 30 is collimated by lens 14 prior to incidence on grating 16. Filtered light beam 30 is directed to diffraction grating 16 such that both time and wavelength dispersion are collapsed by diffraction grating 16 to form an output light beam 36. The output light beam 36 is reflected by a mirror 40 to an input end of an output optical fiber 42. The output light beam 36 is focused by lens 14 on the input end of optical fiber 42. The output light beam 36 is carried by optical fiber 42 to a photodetector 46 which converts the output light beam 36 to an output electrical signal. The output electrical signal is amplified by an amplifier 48.

The diffraction grating 16 is rotated about an axis of rotation 50 by a diffraction grating motor 52 to provide scanning of the spatially dispersed light beam 20 with respect to slit 24. The axis of rotation 50 is selected such that the direction of scan is the same as the axis of dispersion. The light passing through slit 24 represents a scan across a selected wavelength range of the input light beam 12. The width of slit 24 determines the system resolution.

The position of diffraction grating 16 is controlled in a servo loop to provide highly accurate scanning and highly accurate diffraction grating position information. A sweep signal is input through a summing unit 54 and a motor interface 56 to diffraction grating motor 52. The rotational position of diffraction grating 16 about axis 50 is sensed by an optical position encoder 58 having high resolution. The resolution of the position information is further increased by an interpolator 60 which outputs diffraction grating position information. The diffraction grating position information is input to summing unit 54. The difference between the sweep signal, which represents desired diffraction grating position, and the sensed grating position is an error signal used to drive diffraction grating motor 52. Further details regarding the monochromator 8 are disclosed in application Ser. No. 07/788,444, filed on Nov. 6, 1991 and entitled "Optical Spectrum Analyzer Having Double-Pass Monochromator", which is hereby incorporated by reference.

Figure 2:
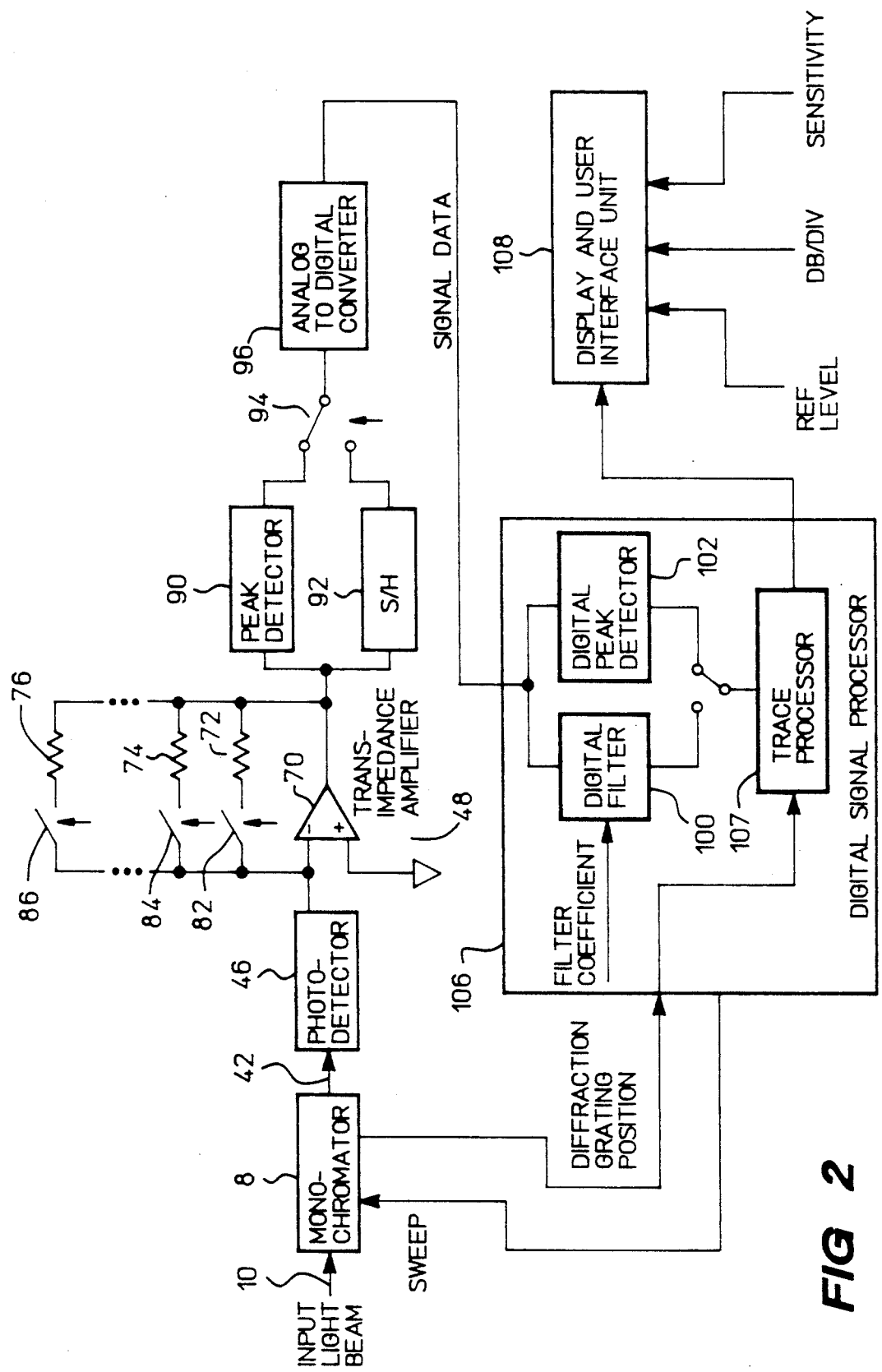
FIG. 2 is a block diagram of an optical spectrum analyzer incorporating the present invention.

A block diagram of an optical spectrum analyzer is shown in FIG. 2. The photodetector 46 converts the output light beam on optical fiber 42 to an electrical signal. The photodetector 46 is typically a photodiode. The amplifier 48 includes a low noise transimpedance amplifier 70. Feedback resistors 72, 74,-76 are selectably connected between the output and the inverting input of amplifier 70 by switches 82, 84-86, respectively, in response to gain control signals. The gain settings permit selection of different sensitivity levels as described below.

The output of transimpedance amplifier 48 is input to a peak detector 90 and to a sample-and-hold unit 92. As described below, the sample-and-hold unit 92 is used for sampling the amplifier output signal when digital filtering is required, and the peak detector 90 is used when digital filtering is not required. An electronically controlled switch 94 connects the output of the peak detector 90 or the sample-and-hold unit 92 to the input of an analog-to-digital converter (ADC) 96. The signal samples from ADC 96 are input to a digital signal processor 106, which provides means for processing the ADC data by digital filtering means 100 or digital peak detection means 102. When digital filtering is required, the output of sample-and-hold unit 92 is connected by switch 94 to ADC 96. When digital filtering is not required, the output of peak detector 90 is connected to ADC 96, and digital peak detection is used. The elements between the photodetector 46 and the digital signal processor 106 constitute a video channel.

A peak detector 90 is provided to allow accurate measurement of the signal amplitude during fast scanning of the monochromator, wherein the rate of change in amplitude of the signal exceeds the sample rate of the ADC 96. In this case, the output of the peak detector 90 holds the maximum value of the signal during the time between ADC conversions. Each ADC value represents the maximum signal amplitude which occurred since the previous ADC value. The ADC sample interval is approximately 40 microseconds.

In a preferred embodiment, an ADC 96 with two input channels is used. The second channel provides a separate peak detector 90, sample-and-hold 92, and switch 94 with gain preceding this circuitry. This additional channel is used to increase the measurement range of the ADC 96. The channel with the highest signal level within the range of the ADC is selected prior to each ADC conversion.

The digital signal processor 106 provides appropriate signals to a display and user interface unit 108 for generating an optical spectrum display as described below. The digital signal processor 106 also provides the sweep signal to monochromator 8 and provides a filter coefficient to digital filter 100 to determine the filter bandwidth. The diffraction grating position information is connected from monochromator 8 to digital signal processor 106 to provide wavelength information for the optical spectrum display. A trace processor 107 combines the diffraction grating position information and the signal data to provide display data to display and user interface unit 108. The digital signal processor 106 can, for example, comprise a Motorola 56001 digital signal processor.

Figure 3:
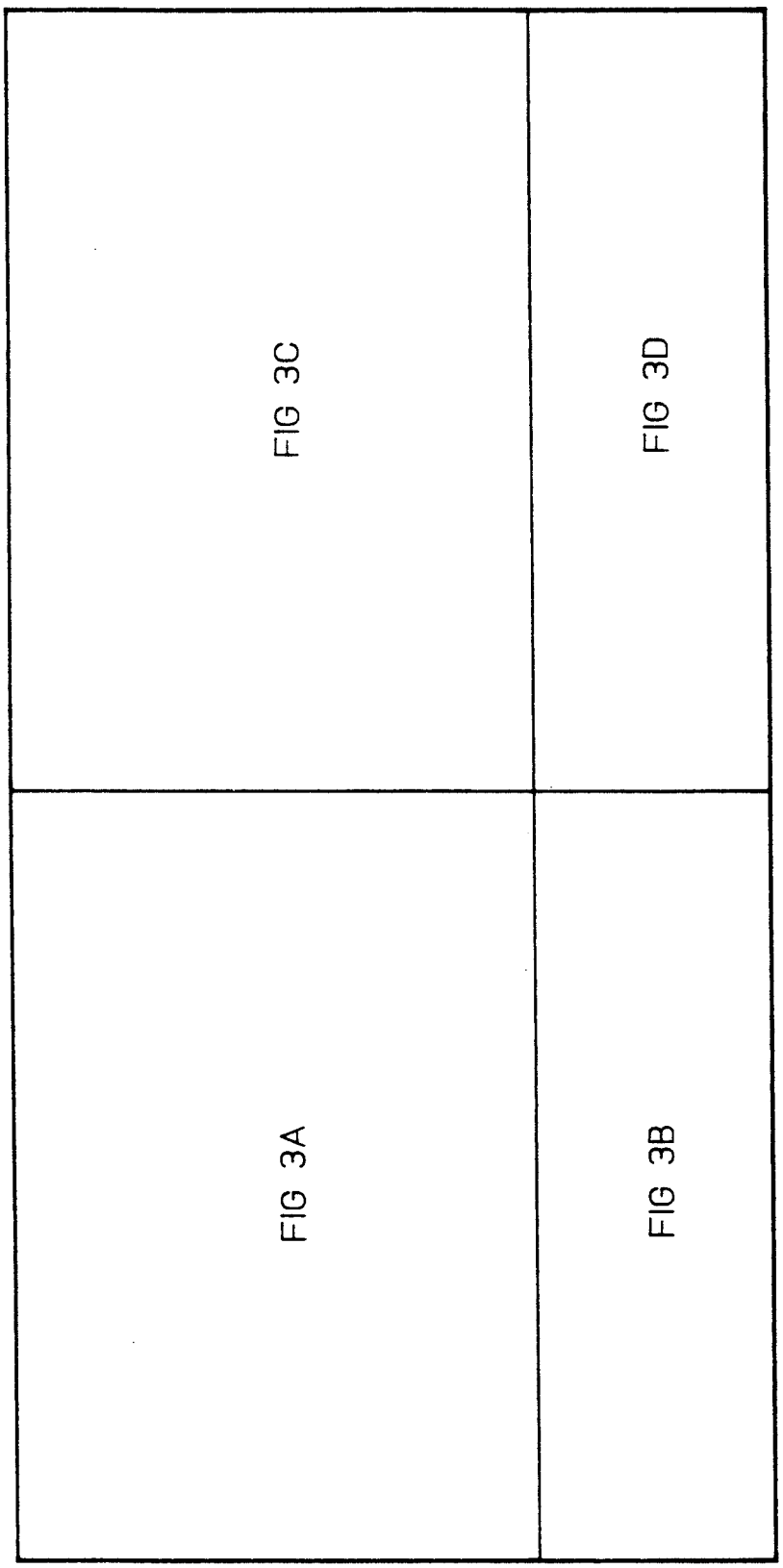
FIGS. 3 and 3A-3D show the display screen and user interface of the optical spectrum analyzer.
Figure 3A:
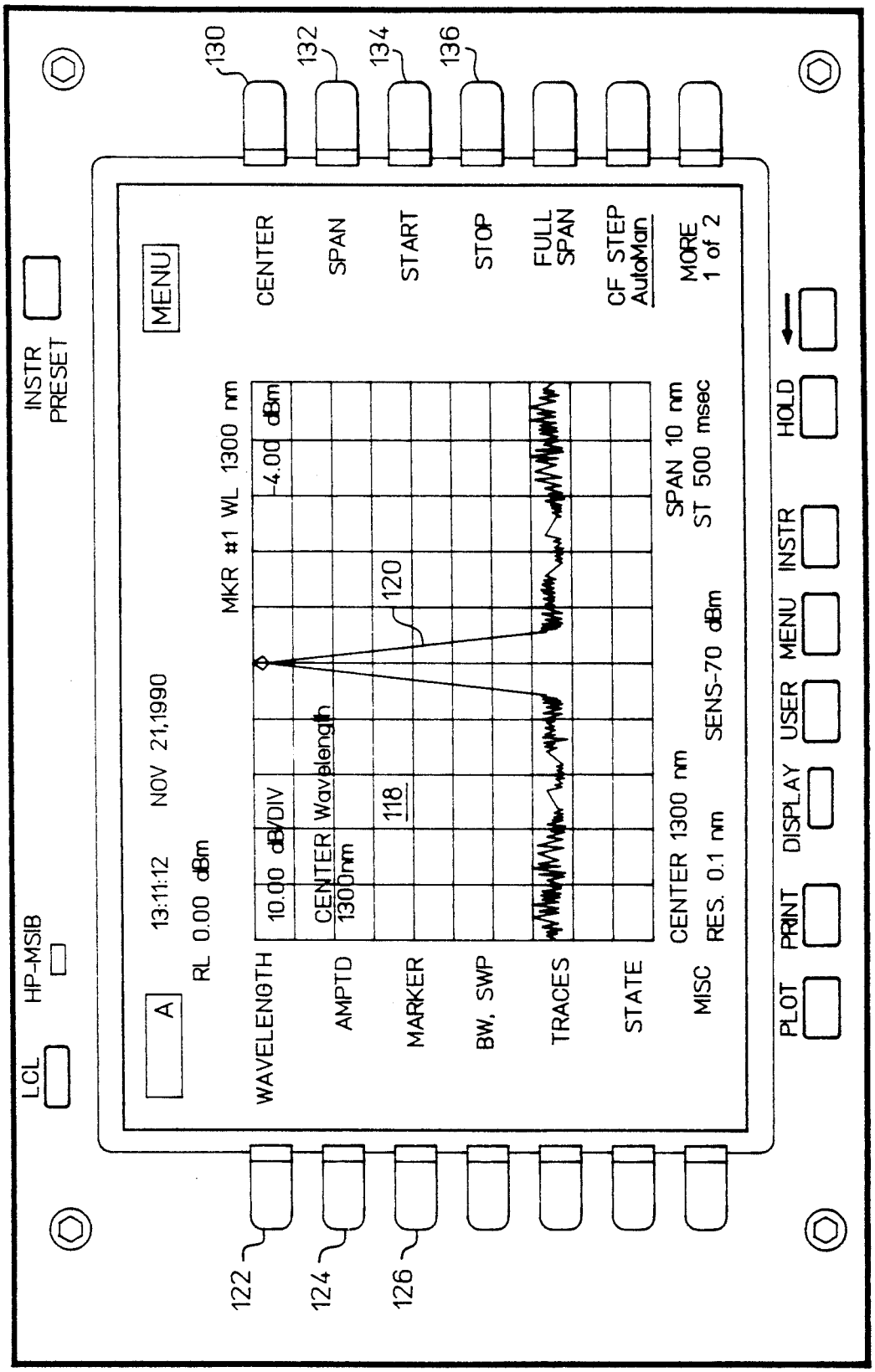
Figure 3B:
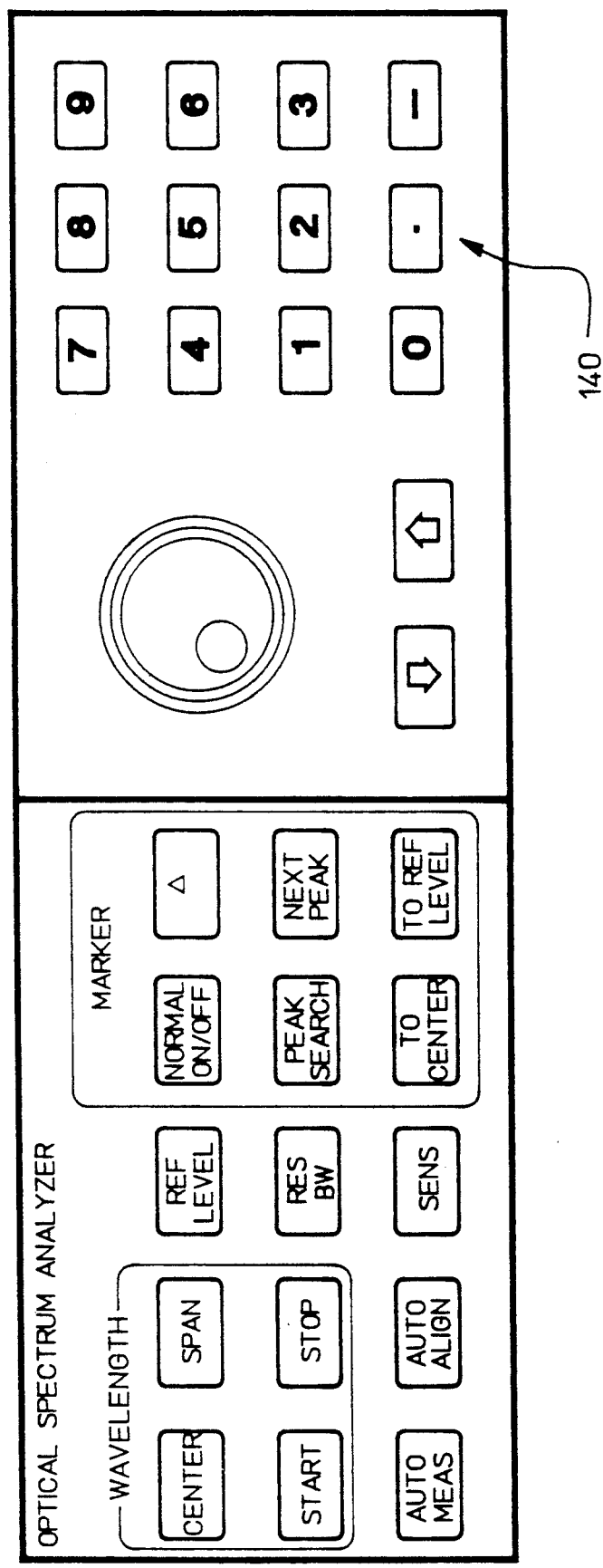
Figure 3C:
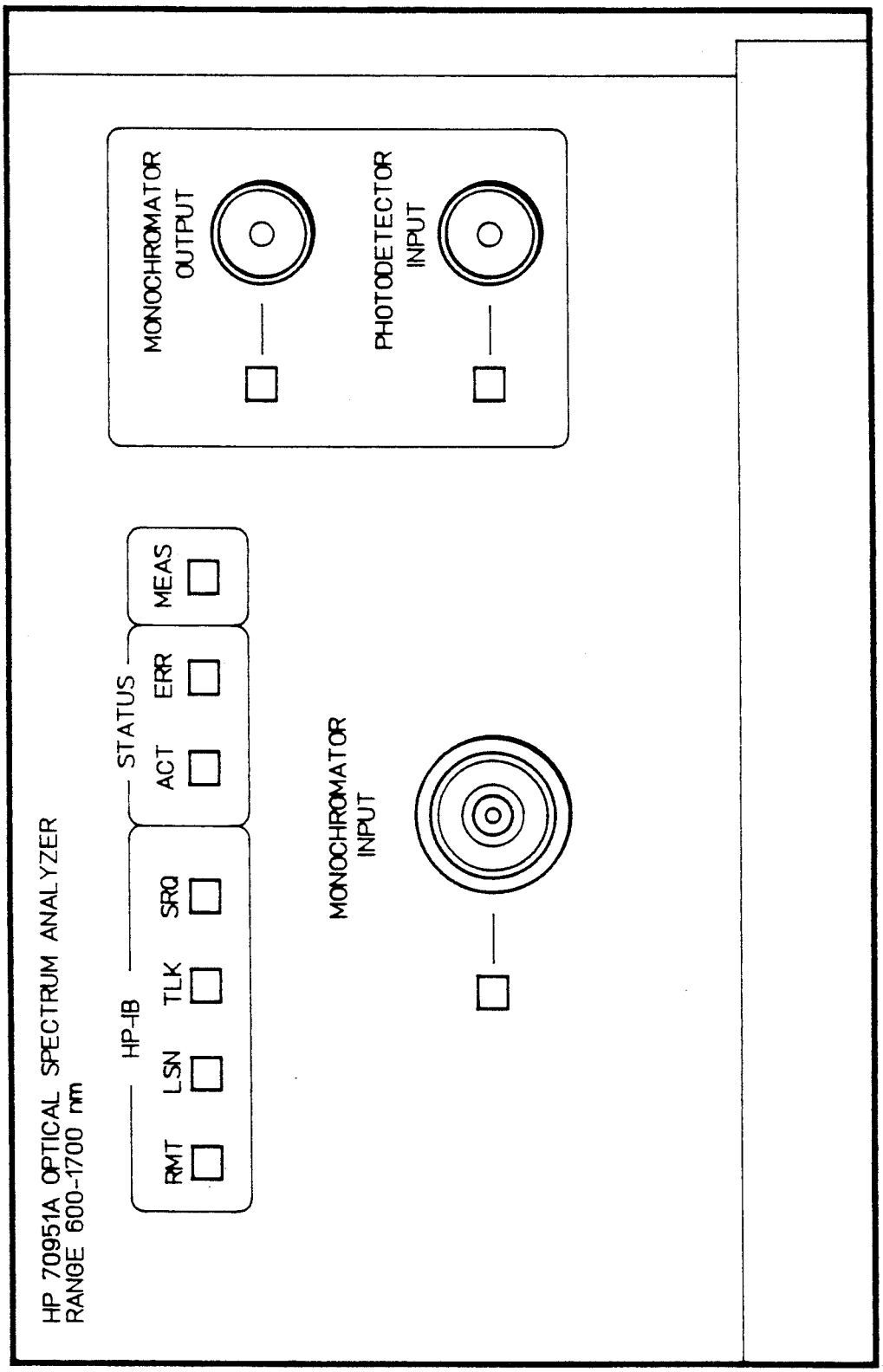
Figure 3D:
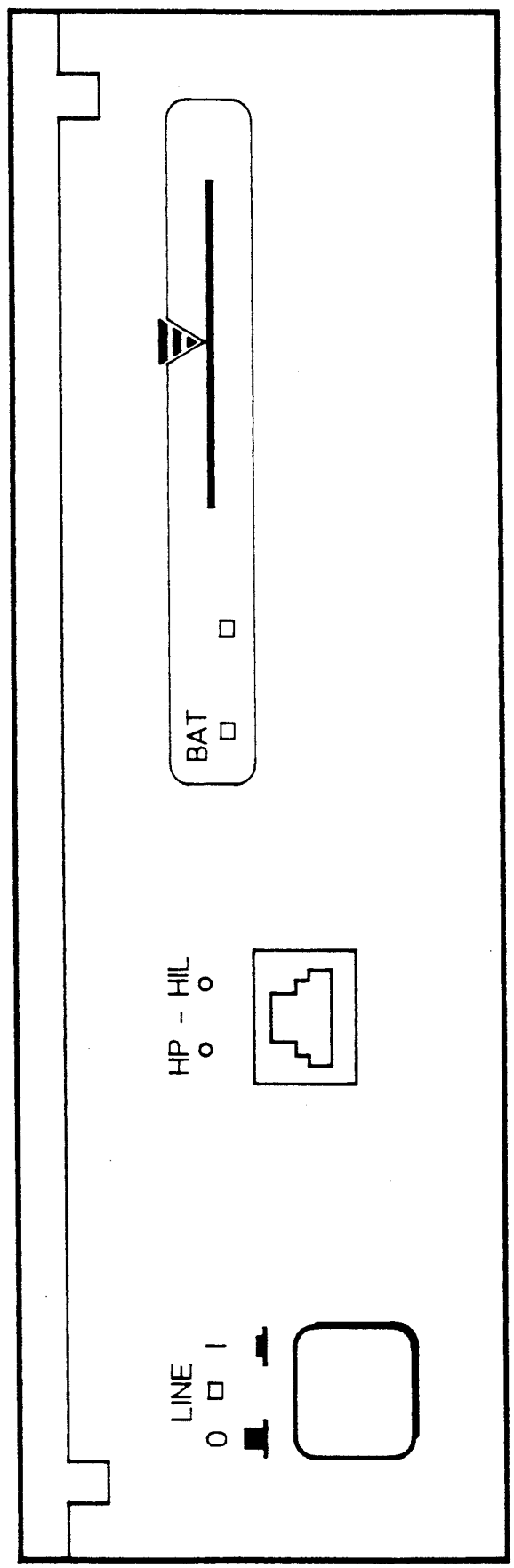

The display screen and user interface of the optical spectrum analyzer are shown in FIG. 3. The amplitude of the input light beam is displayed as a function of wavelength on a display screen 118. A typical spectrum 120 is shown. The instrument provides a menu-based user input. Selector keys 122, 124, 126, etc. along the left edge of the screen permit selection of parameter categories such as wavelength, amplitude, marker, etc. When one of the parameter categories is selected, a menu appears along the right side of the screen permitting selecting of various subparameters using selector keys 130, 132, 134, 136, etc. Values of the subparameters can be entered with a numeric keypad 140. For example, when wavelength is selected with selector key 122, the menu on the right side of the screen permits selection of center wavelength, wavelength span, start wavelength, stop wavelength, etc. When amplitude is selected (see FIG. 5), the menu permits selection of reference level, sensitivity, dB per division (dB/Div), etc. A user interface of the type shown in FIG. 3 is implemented in Models HP71450A and HP71451A, manufactured and sold by Hewlett Packard Company.

Figure 5:
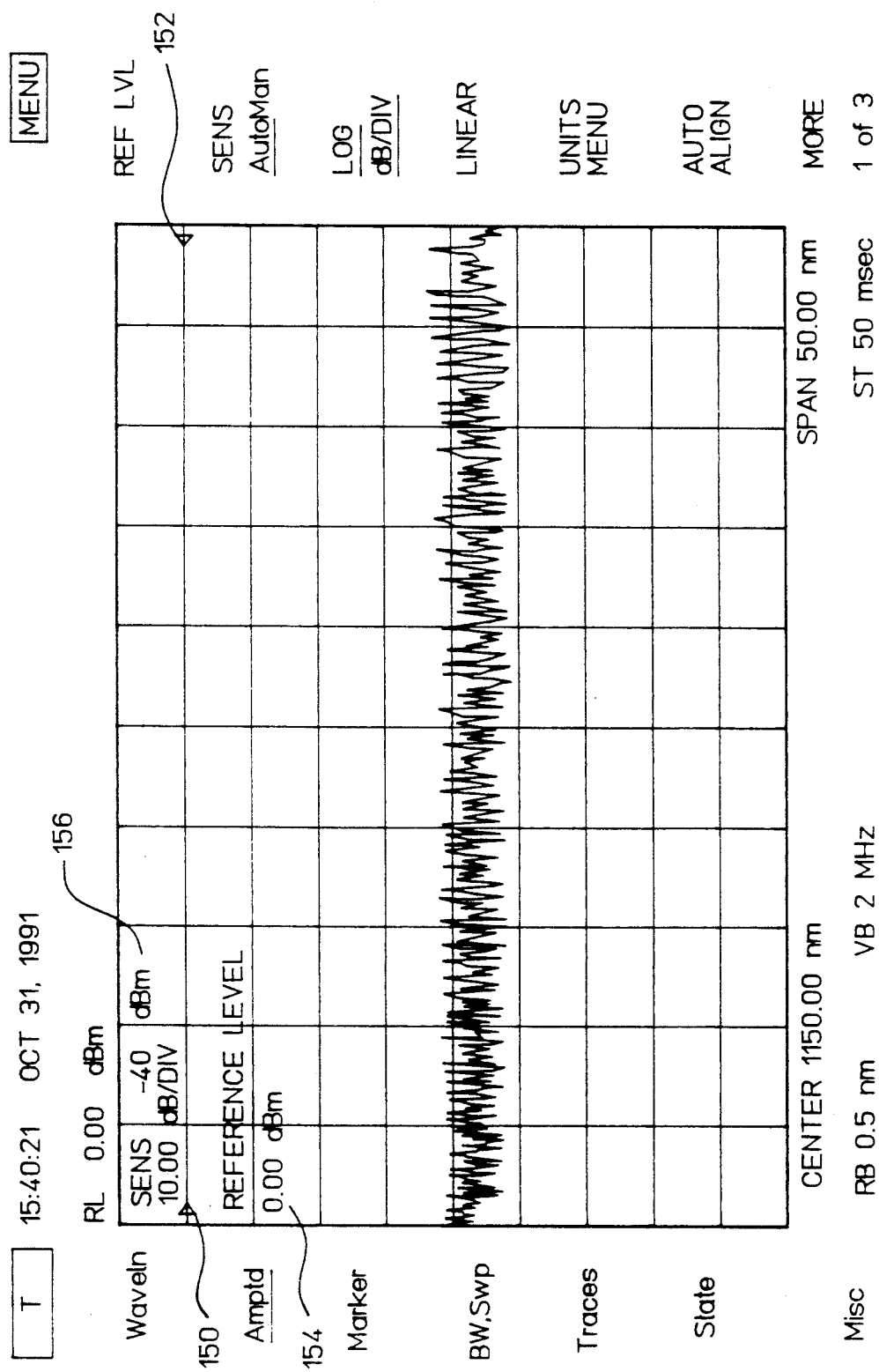
FIGS. 5-8 illustrate the display screen of the optical spectrum analyzer for various reference level and sensitivity settings.
Figure 6:
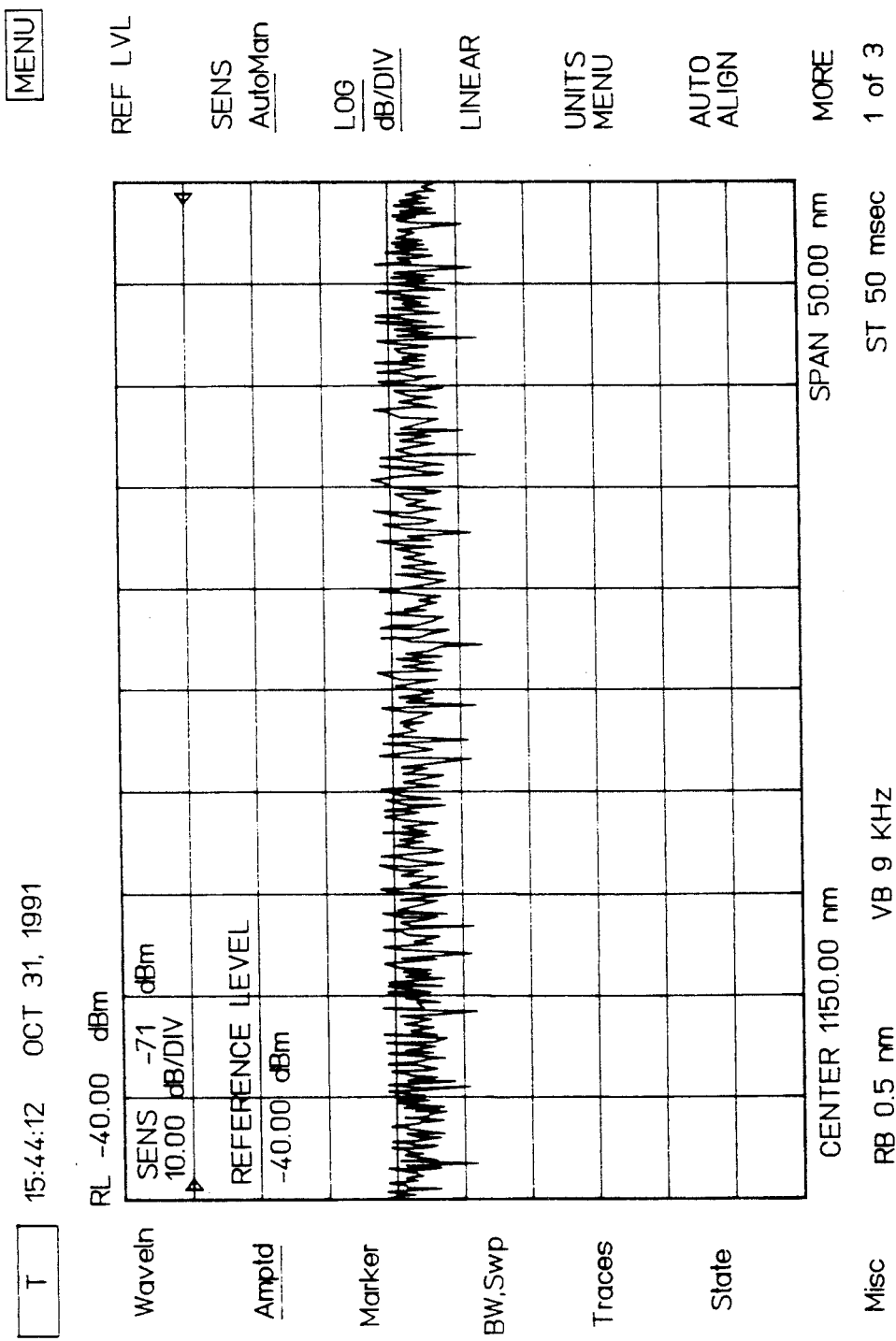

According to a feature of the invention, the user can select sensitivity, reference level and a dB/Div as part of the amplitude parameters, as shown in FIGS. 5-8. The reference level establishes the input optical signal level in dBm for a given vertical position on the display screen. The vertical position of the reference level is indicated by arrows 150 and 152 on opposite sides of the display screen, and the input signal corresponding to the reference level is indicated numerically at 154. The reference level is typically located one division from the top of the screen, but can be positioned by the user at other levels on the display screen. A second input parameter is the vertical scale on the display screen and is typically specified in dB/Div. From the reference level and the dB/Div settings, the input signal level corresponding to the top of the screen is determined. In the example of FIG. 5, the reference level is 0 dBm, the scale is 10 dB/Div, and the top of screen level is +10 dBm. The top of screen level establishes the maximum input optical signal level that can accurately be displayed for the selected set of parameters.

Figure 7:
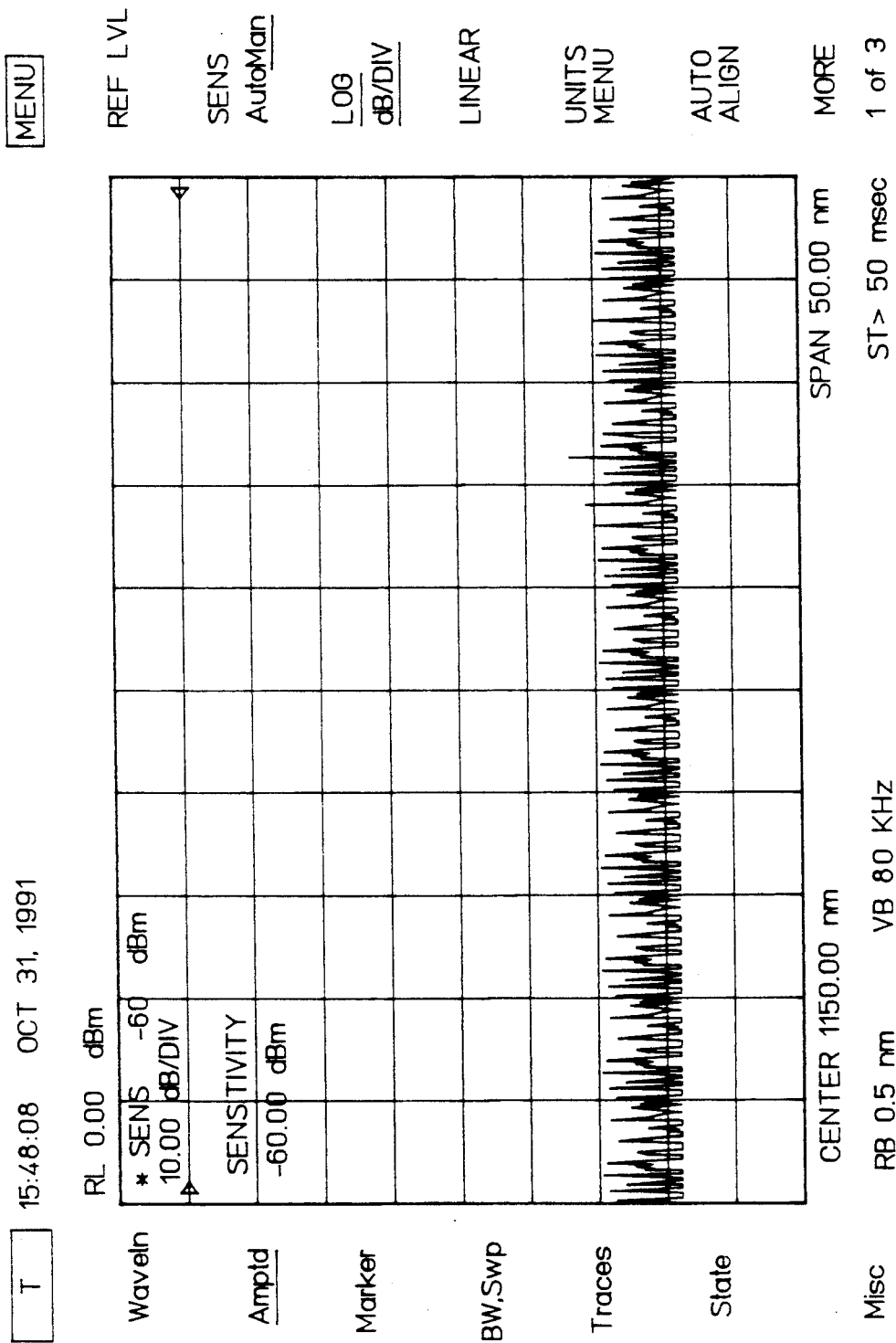
Figure 8:
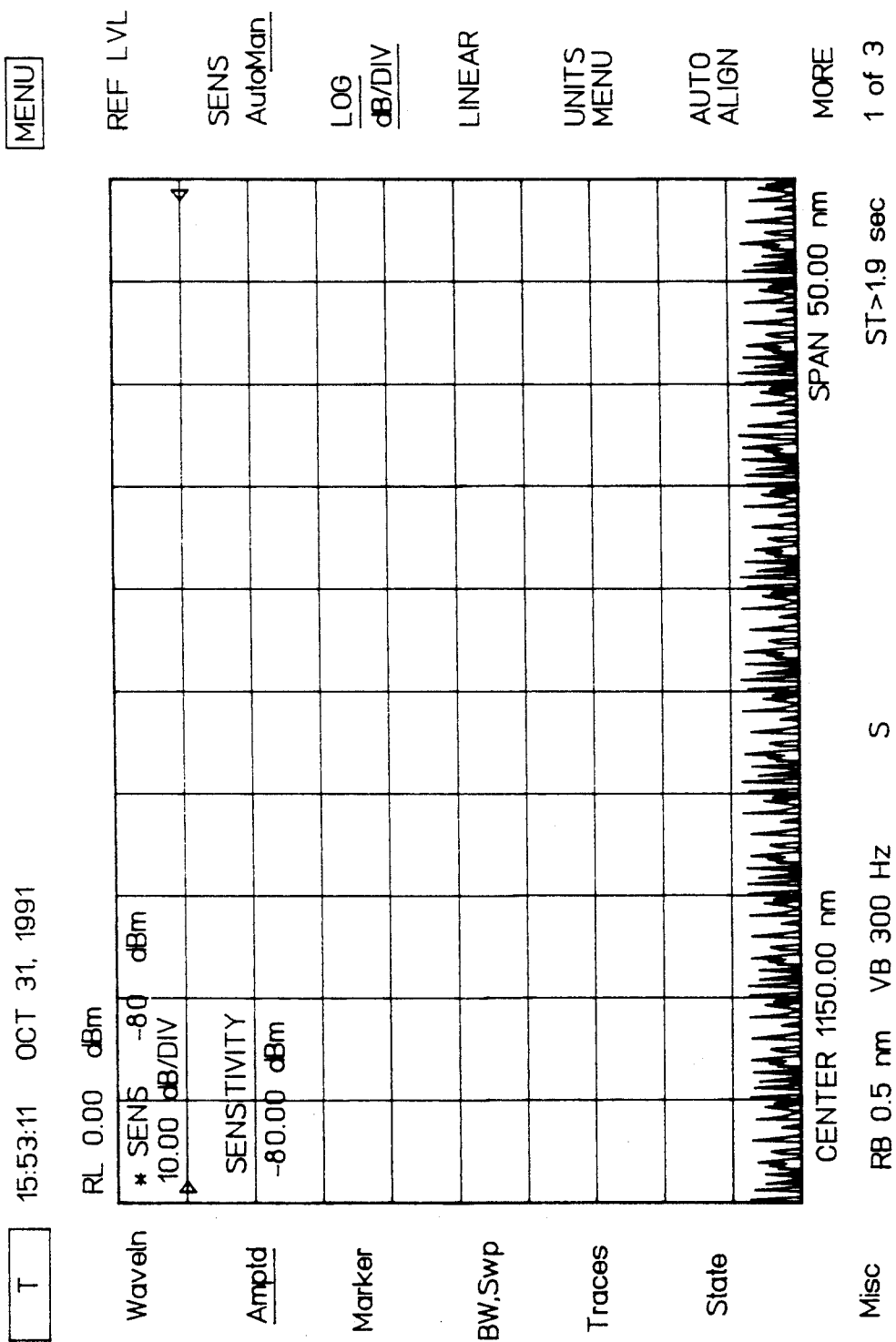

The sensitivity establishes the minimum input signal level which can accurately be measured by the instrument and is specified in dBm. In the optical spectrum analyzer, the sensitivity is defined as 6 times the RMS noise level of the instrument. The sensitivity is indicated numerically on the display screen at 156. As discussed below, the sensitivity can be set by the user or be determined automatically by the instrument. In either case, the sensitivity is displayed on the screen. The user can select sensitivity in 0.1 dBm increments. In the example of FIG. 7, the sensitivity is set at −60 dBm. With the sensitivity setting, the user specifies the minimum input signal level that is of interest. This permits the sweep time to be optimized as described below. When the instrument is more sensitive than required by the user, the sweep time is longer than necessary.

The user selected parameters, reference level, dB/Div and sensitivity, establish the maximum signal level that can be accurately measured (from reference level and dB/Div) and the minimum signal level that can be accurately measured, thereby defining the measurement range of the instrument. From these values, the instrument is set up to provide the performance selected by the user. In general, the internal parameters of the instrument that must be set are (1) the gain of the video channel, which is established by the gain of the transimpedance amplifier 48, (2) the bandwidth of the video channel and (3) the sweep rate. The gain of the transimpedance amplifier 48 must be selected to avoid substantial compression, or clipping, at the maximum input signal level. In addition, it must be insured that the transimpedance amplifier gain provides the selected sensitivity. When a large measurement range is selected by the user, one value of transimpedance amplifier gain may be required for low level signals to obtain the required sensitivity and another value of transimpedance gain may be required to prevent compression of input signals near the maximum measurable signal. In this case, an autoranging mode, wherein the system automatically stops during a sweep and switches gain as required to process large amplitude or small amplitude signals, is used.

As the sensitivity level selected by the user is lowered (the instrument is made more sensitive), the video bandwidth is decreased in order to achieve the selected sensitivity. When the video bandwidth is decreased, the sweep time must be increased accordingly, since sweep time is inversely proportional to video bandwidth. Since the sensitivity and the video bandwidth are both adjustable in small increments, the sweep time can be optimized for the selected parameters. This avoids the problem of increasing the sensitivity a small amount and having a large increase in sweep time.

Figure 4:
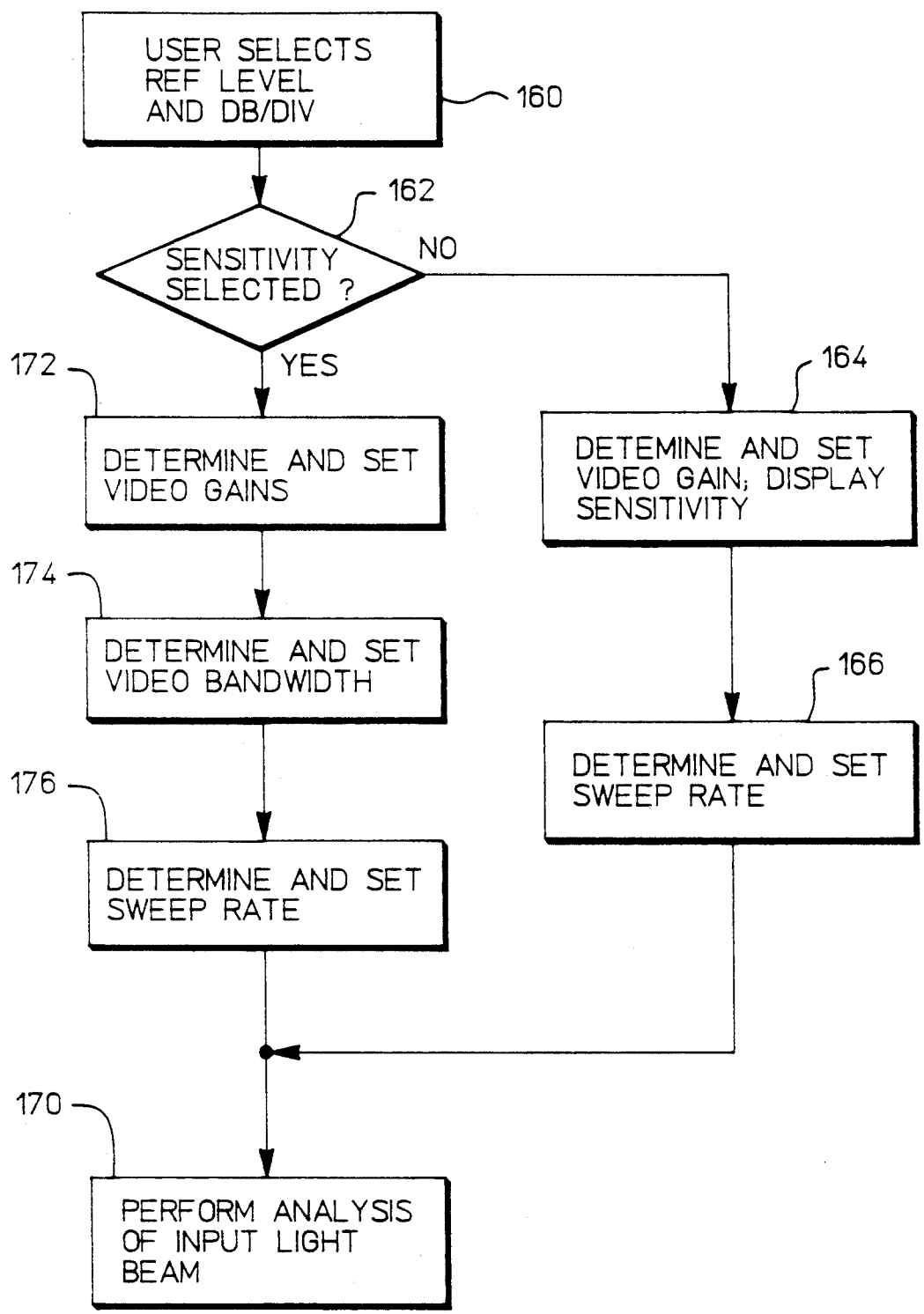
FIG. 4 is a flow diagram of the method for instrument setup for a user selected sensitivity, reference level and vertical scale.

A flow chart of the basic sensitivity setting algorithm performed by the digital signal processor 106 is shown in FIG. 4. The user selects a reference level and a dB/Div scale in step 160. The sensitivity can be determined automatically or manually. A step 162 determines whether a sensitivity level has been selected by the user.

When a sensitivity is not selected by the user, the sensitivity is determined automatically. The top of screen signal level is determined from the selected reference level and dB/Div, and the video gain is set in step 164 to prevent substantial compression of the signal at the top of screen signal level. For each gain setting of transimpedance amplifier 48, there is a corresponding analog video bandwidth and sensitivity. The values of transimpedance amplifier gain, analog video bandwidth and sensitivity are stored in a table. The transimpedance amplifier may, for example, have six gain settings. The sensitivity corresponding to the required gain setting is displayed on the screen in step 164. In the automatic mode, the video bandwidth is the maximum value for the required gain setting, and the digital filter 100 shown in FIG. 2 is not used. A sweep rate is set in step 166 based on the analog video bandwidth at the required gain setting, and the required analysis of the input light beam is performed in step 170.

When the reference level is lowered by the user, the input signal corresponding to the top of screen is reduced, thereby permitting higher video gain and improving the signal-to-noise ratio. As a result, the sensitivity is lowered. Thus, the sensitivity automatically tracks the selected reference level so that the user is provided with the best sensitivity and sweep time for the selected parameters. Since the sensitivity is displayed on the screen, the user is aware of the minimum input signal that can accurately be measured.

When it is determined in step 162 that the user manually selected a sensitivity value, the transimpedance amplifier, or video, gain is determined and set in step 172. In this case, both the maximum measurable signal level, as determined from the top of screen signal level, and the minimum measurable signal level, as specified by the selected sensitivity, are input by the user. The transimpedance amplifier gain to prevent compression at the maximum input signal level is determined. Also, the transimpedance amplifier gain setting required to achieve the selected sensitivity is determined. When the difference between the maximum measurable signal level and the minimum measurable signal level is relatively small, a single gain setting can be used. When a large measurement range is required by the user, a low gain setting is required for input signals near the reference level and a high gain setting is required for input signals near the noise level to achieve the selected sensitivity. In this case, the autoranging mode is required. In the autoranging mode, the high or low gain setting is selected, depending on the input signal level. When the signal level exceeds a predetermined level during a sweep in the high gain setting, the sweep is stopped, backed up slightly, and the gain setting is switched to the low gain value. The sweep then continues at the low gain setting until the signal level drops below a predetermined level. At this time, the sweep stops, backs up slightly, and the gain setting is switched to the high gain value. The instrument continues autoranging between the high and low gain values, depending on the input signal level.

After the transimpedance amplifier gain values have been set, the video bandwidth is determined and set in step 174. The required video bandwidth is based on the selected sensitivity and the gain setting determined in step 172. As indicated above, each gain setting of the transimpedance amplifier 48 has a different analog video bandwidth. In cases where the selected sensitivity is achievable without further video filtering, the effective video bandwidth corresponds to the analog bandwidth of the transimpedance amplifier 48 at the required gain setting.

In cases where the user selects a sensitivity that is below that for the maximum sensitivity setting of the transimpedance amplifier 48, the digital filter 100 is used to further increase sensitivity. The detection mode switches from peak detection mode to sampling mode by connecting sample-and-hold unit 92 through switch 94 to analog-to-digital converter 96. The required video bandwidth is determined, and the filter coefficient for digital filter 100 is calculated to achieve the required video bandwidth.

Next, the sweep rate is determined and set in step 176. When the digital filter 100 is not required and the system is operated in the peak detector mode, the sweep rate is determined from the analog bandwidth of the transimpedance amplifier 48 for the required gain setting. In the sampling mode, when the digital filter 100 is used to reduce the video bandwidth, the sweep rate is determined by the combination of the analog bandwidth of the transimpedance amplifier 48 and the video bandwidth of the digital filter 100. In each case, the sweep rate is adjusted to compensate for the width of slit 24 being used in the monochromator 8. For a narrow slit width, the sweep rate is reduced, whereas for wider slits, the sweep rate is increased. After determination of the sweep rate in step 126, the required analysis of the input light beam is performed in step 170.

The details of the calculations of transimpedance amplifier gain, video bandwidth and sweep rate are given below. Initially, it is necessary to determine the required electrical dynamic range of the detection circuitry. One factor in determining electrical dynamic range is the optical loss through the monochromator from the optical input to the photodetector 46. The optical loss is measured as a function of wavelength at the widest resolution bandwidth of the monochromator. When a narrow slit is used, the photodetector 46 never receives the total available light from the source at any one time, and a correction to optical loss must be made. Additional factors in the required electrical dynamic range include the selected optical sensitivity, the optical sensitivity of the photodetector as a function of wavelength, and the selected reference level. The electrical sensitivity (elect_sens) is given by:

$$\text{elect\_sens(dBm)} = 2*\text{opt\_sens} - \quad (1)$$
$$2*(\text{maximum opt\_loss}(\lambda) \text{ over span}) -$$
$$20\text{Log}(\text{minimum det\_sens}(\lambda) \text{ over span}) - 30$$

and the electrical maximum signal (elect_max_signal) is given by:

$$\text{elect\_max\_signal} = \text{pow }((\text{ref\_level} - \quad (2)$$
$$(\text{minimum opt\_loss}(\lambda) \text{ over span})/10), 10)*(\text{Maximum}$$
$$\text{det\_sens}(\lambda) \text{ over span})/1000 \text{ (Amps)}$$

where opt_loss ($\lambda$) is the optical loss as a function of wavelength from the input to the photodetector over the programmed wavelength span. det_sen ($\lambda$) is the optical sensitivity of the photodetector 46 as a function of wavelength, ref_level is the selected reference level setting and opt_sens is the selected optical sensitivity.

The transimpedance amplifier gain settings are determined from the electrical sensitivity and electrical maximum signal calculated as described above. In addition, the transimpedance gain table includes information pertaining to each gain setting of transimpedance amplifier 48. For each gain (feedback resistor) value of the transimpedance amplifier, the table includes a corresponding sensitivity (in amps and dBm) and an analog bandwidth. As described above, a transimpedance low gain is determined for near reference level signals, and a transimpedance high gain is determined for near noise level signals. The transimpedance gains are determined as follows. The transimpedance low gain setting (ti_low_gain) is given by:

$$r\_\text{max} = \frac{10}{\text{elect\_max\_signal}} \quad \text{ti\_low\_gain} = \quad (3)$$
$$\text{next lower TI Stage value from ti\_gain\_table below r\_max}$$

Example. elect_max_signal = 1.5 milliamps, r_max = 6.66 Kohms and ti_low_gain = 1K ohm. The transimpedance high gain setting (ti_high_gain) is given by:

$$\begin{aligned}\text{ti\_high\_gain} =\ & \text{Minimum value for TI Gain in which} \quad (4)\\ & \text{elect\_sens is greater than Sensitivity.} \\ & \text{When required elect\_sens} < \text{minimum} \\ & \text{sensitivity in highest gain, set} \\ \text{ti\_high\_gain}\ & \text{to highest value (100 MEG}\Omega)\end{aligned}$$

As described above, when the transimpedance high gain is equal to the transimpedance low gain, autoranging is not required.

The video bandwidth and the digital filter coefficient are determined from the previously calculated values of transimpedance high gain, the sensitivity of the transimpedance amplifier in the most sensitive gain setting and the required electrical sensitivity. In cases where the selected sensitivity is achievable without digital filtering, the effective video bandwidth is obtained directly from the above mentioned table of transimpedance gain settings. In cases where the user selects a sensitivity that is less (more sensitive) than the most sensitive setting of the transimpedance amplifier, the most sensitive gain setting of the transimpedance amplifier is selected, and the digital filter 100 is used to increase sensitivity. It is then necessary to determine the digital filter bandwidth to provide the required sensitivity. When the digital filter is used, the detection mode switches from peak to sampling mode. To determine the correct setting for the digital filter, a ratio of the desired sensitivity to the achievable sensitivity is determined. The sensitivity ratio (sens_ratio) is a power ratio and is calculated as follows.

$$\text{sens\_ratio} = 10(\text{elect\_sens} - \text{min\_sens})/10 \quad (5)$$
$$\text{Sens\_ratio is only defined between 0.0 and 0.8 if a value}$$
$$\text{between 0.8 and 1.0 is calculated, use 0.8}$$

The digital filter is modeled using the following equation.

$$y(Z) = \frac{1 - \text{filt\_coeff}}{2} \cdot \frac{1 + Z^{-1}}{1 - (\text{filt\_coeff}) Z^{-1}} \quad (6)$$

where filt_coeff is the digital filter coefficient and Z is the complex variable representation of frequency. The effective video bandwidth (effective vbw) associated with the digital filter is given by:

$$\text{effective\_vbw} = \frac{1}{2\pi 40\ \mu s} \text{ArcCos}\left(\frac{2\text{filt\_coeff}}{1 + \text{filt\_coeff}^2}\right) = \quad (7)$$
$$\frac{2}{2\pi 40\ \mu s} \text{ArcTan}\left(\frac{1 + \text{filt\_coeff}}{1 - \text{filt\_coeff}}\right)$$

The inverse formula to find the filter coefficient given the desired video bandwidth is:

$$\text{filt\_coeff} = \frac{\text{Cos}(2\pi 40\ \mu s\ \text{effective\_vbw})}{1 + \text{Sin}(2\pi 40\ \mu s\ \text{effective\_vbw})} \quad (8)$$

The sweep rate, which is the rate in radians per second that the diffraction grating 16 is rotated about its axis, is determined from the video bandwidth. The sweep rate is limited by the bandwidth of the video channel, which is a function of the transimpedance gain setting, the slew rate of the peak detector 90 and the bandwidth of the digital filter. The sweep rate dθ/dT is calculated in radians per second rotation by the grating motor 52. The sweep time as displayed on the screen is determined from the sweep rate and the start and stop wavelengths $\lambda_1$ and $\lambda_2$. The sweep time T is given by:

$$T = \frac{\text{ArcSin}\left(\frac{n\lambda_1}{2d}\right) - \text{ArcSin}\left(\frac{n\lambda_2}{2d}\right)}{d\theta/dt} \quad (9)$$

where d is a constant and n is the order of the diffraction grating. In the peak detector mode when the digital filter 100 is not utilized, the sweep rate is determined as follows.

$$\frac{d\theta}{dt} = \min\left[1.67 \cdot \frac{f_{3dB}(TI)}{\alpha(X_s)}\right] \quad (10)$$

where $f_{3dB}(TI)$ is the analog bandwidth of the transimpedance amplifier obtained from the table as described above, and $\alpha(X_s)$ is a sweep coefficient that varies with the selected slit in the monochromator 8. The sweep coefficient is taken from a table which lists a sweep coefficient for each slit that can be selected. The sweep coefficient is relatively large for narrow slits and is relatively small for wide slits. The effect of the sweep coefficient is to reduce the sweep rate for narrow slits. In the sample mode when the digital filter is being used, the sweep rate is calculated as follows.

$$\frac{d\theta_{wid}}{dt} = \min\left[1.67 \cdot f_{vbw} \cdot (3.87 \cdot 10^{-5} - 0.35 \cdot X_s) \cdot \frac{f_{3dB}(TI)}{\alpha(X_s)}\right] \quad (11)$$

for $X_s < 30$ um use:

$$\frac{d\theta_{narrow}}{dt} = \frac{1}{2} \cdot \frac{d\theta_{wid}}{dt}$$

where $f_{vbw}$ is the effective video bandwidth of the system approximated by the combined bandwidth of the digital filter bandwidth and the analog bandwidth of the transimpedance amplifier, $f_{3dB}$ is the analog bandwidth of the transimpedance amplifier, $X_s$ is the slit width, and $\alpha(X_s)$ is the sweep coefficient discussed above. For values of $X_s$ less than 30 micrometers, the sweep rate is typically reduced by one half.

The above configuration of the optical spectrum analyzer provides an instrument that is more easily used and provides more information to the user. By permitting a sensitivity to be selected by the user, the sweep rate is optimized for the measurement conditions selected by the user. Furthermore, additional information, such as the minimum signal that is accurately measurable, is clearly evident to the user.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for spectrum analysis of an input light beam using an optical spectrum analyzer, said method comprising the steps of:
    providing said optical spectrum analyzer with a user selectable sensitivity;
    said optical spectrum analyzer setting required operating parameters in response to user selection of sensitivity to permit measurement of the input light beam at the selected sensitivity; and
    said optical spectrum analyzer providing an optical spectrum of said input light beam at the selected sensitivity.

2. A method as defined in claim 1 wherein said optical spectrum analyzer includes a video channel that processes an electrical signal representative of the intensity of said input light beam as a function of wavelength and wherein the step of setting required operating parameters includes setting a required gain of said video channel, in response to user selection of sensitivity and in response to user specification of a maximum input signal, to permit measurement of said maximum input signal and to provide the selected sensitivity.

3. A method as defined in claim 2 wherein the step of setting required operating parameters further includes setting a required video bandwidth of said video channel to provide the selected sensitivity at the required gain of said video channel and setting a sweep rate at which said optical spectrum analyzer performs a wavelength scan of said input light beam to provide the selected sensitivity at the required video bandwidth.

4. A method as defined in claim 3 wherein the step of setting a required video bandwidth includes passing the electrical signal through a digital filter and setting a filter coefficient of the digital filter to provide the required video bandwidth.

5. A method for spectrum analysis of an input light beam using an optical spectrum analyzer which performs a wavelength scan of said input light beam in response to a sweep signal to provide an electrical signal that represents the intensity of said input light beam as a function of wavelength, said method comprising the steps of:
    providing said optical spectrum analyzer with a user selectable sensitivity, said optical spectrum analyzer having a video channel that processes said electrical signal;
    said optical spectrum analyzer setting a required gain of said video channel in response to user selection of sensitivity and in response to user specification of a maximum input signal to permit measurement of said maximum input signal and to provide the selected sensitivity;
    said optical spectrum analyzer setting a required video bandwidth of said video channel to provide the selected sensitivity at the required gain of said video channel;
    said optical spectrum analyzer setting a sweep rate of the sweep signal to provide the selected sensitivity at the required video bandwidth; and
    said optical spectrum analyzer performing a wavelength scan of said input light beam and displaying said electrical signal as a function of wavelength to provide an optical spectrum of said input light beam at the selected sensitivity.

6. A method as defined in claim 5 wherein the step of setting a required gain of said video channel includes the step of setting a single gain value that permits measurement of the maximum input signal without substantial compression and that provides the selected sensitivity.

7. A method as defined in claim 5 wherein the step of setting a required gain of said video channel includes the step of setting a low gain value to permit measurement of said maximum input signal without compression and setting a high gain value to provide the selected sensitivity, and wherein the step of performing a wavelength scan of the input light beam includes autoranging between the high and low gain values during said wavelength scan, depending on the level of the input light beam.

8. A method as defined in claim 5 wherein the step of setting a required video bandwidth includes passing the electrical signal through a digital filter and setting a filter coefficient of the digital filter to provide the required video bandwidth.

9. A method as defined in claim 5 wherein the step of setting a required video bandwidth includes using an analog bandwidth of said video channel at the required gain without additional filtering.

10. An optical spectrum analyzer for spectrum analysis of an input light beam comprising:
   means for performing a wavelength scan of said input light beam in response to a sweep signal to provide an electrical signal that represents the intensity of said input light beam as a function of wavelength;
   means for displaying said electrical signal as a function of wavelength to provide an optical spectrum of said input light beam;
   means responsive to a user selected sensitivity for setting required operating parameters to permit spectrum analysis of the input light beam at the selected sensitivity.

11. Apparatus as defined in claim 10 wherein said optical spectrum analyzer further comprises a video channel that processes said electrical signal and wherein said means for setting require operating parameters includes means for setting a required gain of said video channel in response to said user selected sensitivity and in response to user specification of a maximum input signal to permit measurement of said maximum input signal and to provide the selected sensitivity.

12. Apparatus as defined in claim 11 wherein said means for setting required operating parameters further includes means for setting a required video bandwidth of said video channel to provide the selected sensitivity at the required gain of said video channel and means for setting a sweep rate of the sweep signal to provide the selected sensitivity at the required video bandwidth.

13. Apparatus as defined in claim 12 wherein said video channel includes a digital filter for filtering said electrical signal and wherein said means for setting a required video bandwidth includes means for setting a filter coefficient of said digital filter to provide the required video bandwidth.

14. A method for spectrum analysis of an input light beam using an optical spectrum analyzer, said method comprising the steps of:
   providing said optical spectrum analyzer with a user specified maximum input signal;
   said optical spectrum analyzer setting required operating parameters to permit measurement of the user specified maximum input signal;
   said optical spectrum analyzer displaying a sensitivity that corresponds to the required operating parameters; and
   said optical spectrum analyzer providing an optical spectrum of said input light beam.

15. An optical spectrum analyzer for spectrum analysis of an input light beam comprising:
   means for performing a wavelength scan of said input light beam to provide an electrical signal that represents the intensity of said input light beam as a function of wavelength;
   means for detecting a peak value of said electrical signal during each of a plurality of predetermined intervals;
   means for measuring said peak values during each of said predetermined intervals; and
   means for displaying said peak values as a function of wavelength to provide an optical spectrum of said input light beam.

16. An optical spectrum analyzer as defined in claim 15 wherein said means for measuring comprises an analog-to-digital converter.

17. A method for spectrum analysis of an input light beam using an optical spectrum analyzer, said method comprising the steps of:
   performing a wavelength scan of said input light beam to provide an electrical signal that represents the intensity of said input light beam as a function of wavelength;
   detecting a peak value of said electrical signal during each of a plurality of predetermined intervals;
   measuring said peak values during each of said predetermined intervals; and
   displaying said peak values as a function of wavelength to provide an optical spectrum of said input light beam.

* * * * *

UNITED STATES PATENT AND TRADEMARK OFFICE
CERTIFICATE OF CORRECTION

PATENT NO. : 5,177,560

DATED : Jan. 5, 1993

INVENTOR(S) : James R. Stimple, et al.

It is certified that error appears in the above-identified patent and that said Letters Patent is hereby corrected as shown below:

On the title page

Inventor's name Zoltana D. Azary should be --Zoltan D. Azary--

ABSTRACT

Line 7, "maximum light signal" should be --maximum input signal--

Signed and Sealed this

Twenty-eighth Day of December, 1993

Attest:

BRUCE LEHMAN

Attesting Officer     Commissioner of Patents and Trademarks